(12) United States Patent
Yang et al.

(10) Patent No.: US 12,256,320 B2
(45) Date of Patent: Mar. 18, 2025

(54) METHOD AND SYSTEM FOR PACKET DATA NETWORK SERVICE SLICING OVER A NETWORK INFRASTRUCTURE FOR REAL-TIME IP SERVICES

(71) Applicant: TELEFONICA INNOVACION DIGITAL SL, Madrid (ES)

(72) Inventors: Xiaoyuan Yang, Madrid (ES); Josue Igual Blanco, Madrid (ES); Emilio A. Garrido Garcia, Madrid (ES)

(73) Assignee: TELEFONICA INNOVACION DIGITAL SL, Madrid (ES)

( * ) Notice: Subject to any disclaimer, the term of this patent is extended or adjusted under 35 U.S.C. 154(b) by 577 days.

(21) Appl. No.: 17/646,510

(22) Filed: Dec. 30, 2021

(65) Prior Publication Data

US 2022/0225226 A1 Jul. 14, 2022

(30) Foreign Application Priority Data

Jan. 13, 2021 (EP) .................................. 21382012

(51) Int. Cl.
*H04W 48/18* (2009.01)
*G06F 9/455* (2018.01)
(Continued)

(52) U.S. Cl.
CPC ........ *H04W 48/18* (2013.01); *G06F 9/45558* (2013.01); *H04W 4/50* (2018.02);
(Continued)

(58) Field of Classification Search
CPC ............................... H04W 48/18; H04W 4/50
See application file for complete search history.

(56) References Cited

U.S. PATENT DOCUMENTS

| | | |
|---|---|---|
| 6,157,623 A | 12/2000 | Kerstein |
| 2008/0259794 A1* | 10/2008 | Zou ..................... H04L 41/5096 370/231 |

(Continued)

FOREIGN PATENT DOCUMENTS

EP 1 981 219 A1 10/2008

OTHER PUBLICATIONS

Rafael Montero et al., "End-to-End 5G Service Deployment and Orchestration in Optical Networks with QoE Guarantees", 20th International Conference on Transparent Optical Networks (ICTON), IEEE, Jul. 31, 2018, pp. 1-4.
(Continued)

*Primary Examiner* — Kodzovi Acolatse
*Assistant Examiner* — Maryam Emadi
(74) *Attorney, Agent, or Firm* — Sughrue Mion, PLLC

(57) ABSTRACT

A method and an orchestration server for packet data network service slicing over a network infrastructure for real-time IP services are provided. The method comprises providing an orchestration server that has knowledge of a whole connectivity status of a network infrastructure and that is configured to manage service nodes. The server receives a session request for a real-time IP service from a UE device located in a given region and requests to one or more service nodes of said given region whether it has/they have network resources. Each of the one or more service nodes compute a QoS measurement thereof in terms of KPIs including latency, jitter and bandwidth, the QoS measurement being computed by a software module that is implemented on a virtual machine deployed on the service node; and tag a plurality of interfaces. The orchestration server selects a given service node in view of said QoS measurement.

9 Claims, 3 Drawing Sheets

(51) Int. Cl.
  *H04W 4/50*   (2018.01)
  *H04W 28/02*  (2009.01)
  *H04W 76/10*  (2018.01)

(52) U.S. Cl.
  CPC ....... *H04W 28/0268* (2013.01); *H04W 76/10* (2018.02); *G06F 2009/45595* (2013.01)

(56) References Cited

U.S. PATENT DOCUMENTS

| | | | |
|---|---|---|---|
| 2010/0042449 A1* | 2/2010 | Thomas | H04L 41/5006 |
| | | | 705/35 |
| 2019/0207674 A1* | 7/2019 | Roy | H04L 12/4645 |
| 2020/0110625 A1 | 4/2020 | Warnicke et al. | |
| 2020/0228466 A1* | 7/2020 | Wang | H04L 69/22 |
| 2022/0141192 A1* | 5/2022 | Silveira | H04L 63/0823 |
| | | | 726/15 |

OTHER PUBLICATIONS

European Search Report for 21 38 2012 dated, Jun. 18, 2021.

* cited by examiner

METHOD AND SYSTEM FOR PACKET DATA NETWORK SERVICE SLICING OVER A NETWORK INFRASTRUCTURE FOR REAL-TIME IP SERVICES

TECHNICAL FIELD

The present invention is directed, in general, to the field of Internet Protocol (IP) traffic delivering methods and systems. In particular, the invention relates to a method and to a system for packet data network service slicing over a network infrastructure for real-time IP services.

BACKGROUND OF THE INVENTION

Deliver of IP traffic in existing network infrastructures in real time is the key enabler for IoT, education, videoconference, etc. applications in near future. One of these examples is the Cloud-Gaming where video traffic has to be available in client device from the server in a constant bit rate and less than certain deterministic delay between packets. Another application is the video-conference where video and audio data have to be exchanged among users in real time faction, respecting a very strict Quality of Service (QoS).

Providing QoS in broadband network is not easy. First, current network is mostly packet-based where multiple elements (routers) work independently based on local decisions to deliver one packet to next element. Packet-based network architecture achieves high scalability in exchange of not able to provide End-2-End (E2E) QoS insurance, such as circuit-based network.

Second, although currently network stack provide mechanisms to define packet priorities, it requires costly configurations that have to be propagated to all involved elements. For instance, some ISP configures specific VLAN to isolate the traffic and configure a full-network QoS setting.

Third, packet or a specific application has to be currently identified to apply any configured priority. Any packet identification is based on 5-tuple information (Origin IP, Destine IP, Origin Port, Destine Port, Traffic type). In order to correctly identify packets, the 5-tuple information has to be stable, and not shared among multiple applications. As consequence, application cannot be easily migrated from one IP to another, or even executed in a Public Cloud infrastructure.

DESCRIPTION OF THE INVENTION

Present invention proposes a Network Slice E2E QoE Service that helps any service provider, such as Gaming and Videoconference Service providers, that want to provide new and highly demanding services like HD Videoconference or Cloud Gaming, by offering a programmable E2E QoS for real-time traffic, in a multitenant and pay-as-you-go model, without requiring upfront infrastructure investments and costly integrations.

To that end, embodiments of the present Invention provide according to a first aspect a method for packet data network service slicing over a network Infrastructure for real-time IP services, said network infrastructure comprising a plurality of regions linked via a transportation network, each region of the plurality of regions having a plurality of service nodes. The method comprises providing an orchestration server at a given location where a service provider is located, the orchestration server having knowledge of a whole connectivity status of the network infrastructure, and being configured to manage the plurality of service nodes; receiving, by the orchestration server, a session request for a real-time IP service from a user equipment (UE) device located in a given region of said plurality of regions; upon reception of said session request, and requesting, by the orchestration server, to one or more service nodes of the plurality of service nodes of said given region whether it has/they have network resources.

Each of the one or more service nodes upon reception of said request can compute a Quality of Service (QoS) measurement thereof in terms of Key Performance Indicators, KPI, including latency, jitter and bandwidth, the QoS measurement being computed by a software module that is implemented on a virtual machine or container within a virtual or physical machine deployed on the service node; and can tag a pluralty of interfaces, the tagging being performed by the virtual machine/container. The orchestration server can then select a given service node of the one or more service nodes in view of the QoS measurement.

The plurality of interfaces can comprise three interfaces, a first one for IP management, a second one for international IP traffic and a third one for IP services.

In an embodiment, the software module further computes which route through the IP services interface has to be used for the session request.

In an embodiment, the one or more service nodes besides computing the QoS measurement further compute a set of metrics including IP metrics, User Datagram Protocol (UDP) metrics, Transmission Control Protocol (TCP) metrics and/or Internet Control Message Protocol (ICMP) metrics.

In an embodiment, the selecting step further comprises discarding the service nodes of said one or more service nodes with an available capacity metric (ACMG) less than a threshold. Alternatively or complementarily, the selecting step can also comprise discarding the service nodes of the one or more service nodes with a Health Node Indicator (HHNI) less than a threshold.

In an embodiment, in order to select the best node in a candidate list, a value for each candidate is computed by taking into account: 1) the latency between the candidate and all participant (end-users) in the session; 2) the jitter between the candidate and all participant (end-users) in the session; and 3) the importance of the participant in the session. Then, the computed latency and jitter can be aggregated using a $\alpha \in [0,1]$ that indicates the relative importance of latency and jitter in a given service. The idea is to select the candidate that give best performance, in term of latency and jitter, taking into account that no every participant has the same importance in the communication session.

The real-time IP service can include any of video conference, gaming, remote video production, and remote health, among others.

Embodiments of the present invention also provide according to a second aspect an orchestration server for packet data network service slicing over a network infrastructure for real-time IP services. The orchestration server is located at a given location where a service provider is located, has knowledge of a whole connectivity status of a network infrastructure, and is configured (it may have memory and processing elements to that end) to receive a session request for a real-time IP service from a UE device located in a given region of a plurality of regions; request to one or more service nodes of a plurality of service nodes of said given region whether it has/they have network resources; and select a given service node of the one or more service nodes in view of a QoS measure of the one or more service nodes in terms of KPIs including latency, jitter and bandwidth, the QoS measure being computed by a software module implemented on a virtual machine or a container within a virtual or physical machine deployed on each one of the one or more service nodes, the virtual machine/container being further configured to tag a plurality of interfaces.

Embodiments of the present invention also provide according to a third aspect a system for packet data network service slicing over a network infrastructure for real-time IP services. The system comprises a plurality of service nodes and an orchestration server. The orchestration server is located at a given location where a service provider is located, has knowledge of a whole connectivity status of the network infrastructure, and is configured to manage the plurality of service nodes. Each of the plurality of services nodes comprises a software module that is implemented on a virtual machine deployed on the service node. Each of the service nodes upon reception of a request from the orchestration server is configured to compute a Quality of Service (QoS) measurement thereof in terms of KPI including latency, jitter and bandwidth, and to tag a plurality of interfaces, using the cited software module and virtual machine or container Other embodiments of the invention that are disclosed herein also include software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Therefore, present invention provides a programmable E2E API for real-time traffic, also offered as a platform/server, that provides a network slice for real time services such as video conference, gaming, remote video production, remote health, and industrial—IoT service providers. The invention controls the QoS in terms of control bandwidth, latency and jitter in the communication network slide provided. To achieve the required quality, the use of several technologies is used, for example 802.1p, VLAN tagging and DSCP. Depending on the network section in which the communication takes place, the use of the technology may change. For mobile networks also QCI (QoS Class identifiers) can be used.

Likewise, the invention provides a monitoring for each user in order to offer a set of KPIs and dashboards to control the service.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF PREFERRED EMBODIMENTS

Present invention proposes a network infrastructure based on the combination of the most standard protocols for NAT traversal and programmable network QoS stack to provide network slices for any real-time application. In the following the invention is sometimes referred as Hanzo.

Figure 1:
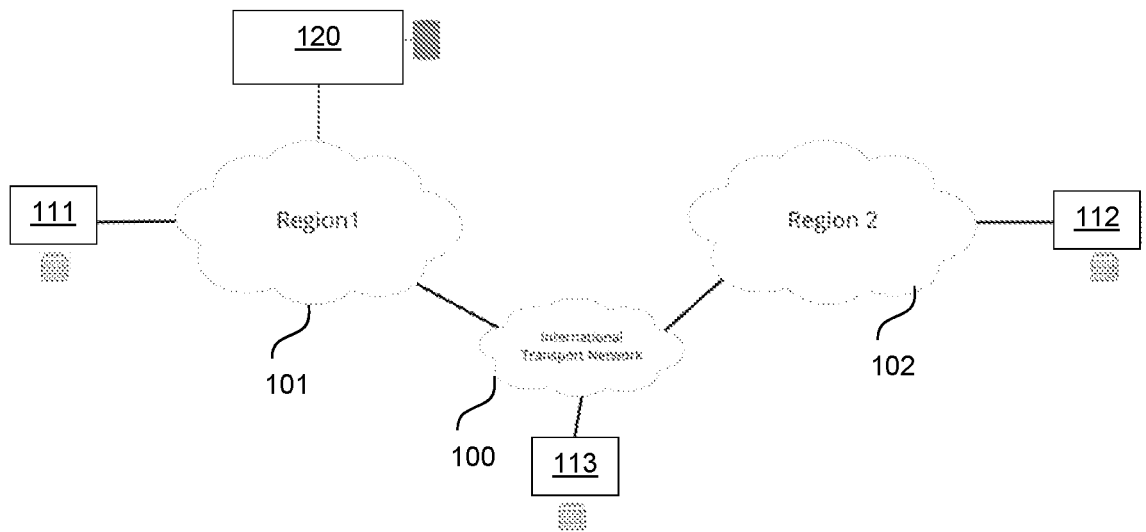
FIG. 1 schematically illustrates a network infrastructure with the proposed network elements for implementing the present invention.

FIG. 1 shows an embodiment of the network infrastructure for deployment of the present invention. The overall architecture is based on an orchestration server (or Global platform or Hanzo Global) 120, that is operated and managed from a single location. This allows a greater ease of operation and maintenance. In addition, the network infrastructure comprises different regions 101, 102, each one having a specific number of service nodes (or Hanzo nodes) 111, 112, depending on the size of the territory and the volume of traffic received.

The relationship between each region and country will be 1:1, except in the case of the international transportation region 100, which will be used as a link between regions 101, 102. The architecture will be like as a usual hub and spoke type.

Figure 2:
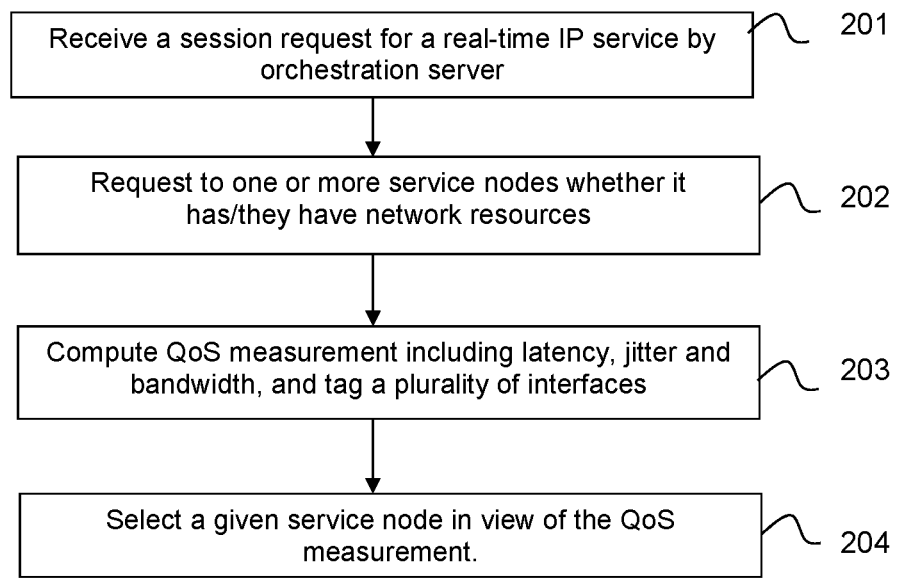
FIG. 2 is a flow chart illustrating the proposed method, according to an embodiment.

With regard to FIG. 2, therein an embodiment of a method for packet data network service slicing over a network infrastructure for real-time IP services is Illustrated. According to this embodiment, at step 201, an orchestration server 120 receives a session request for a real-time IP service from a UE device located in a given region of the regions 101, 102.

At step 202 the orchestration server 120 requests to one or more service nodes of said given region whether it has/they have network resources. At step 203 each of the one or more service nodes upon reception of said request compute a QoS measurement thereof in terms of KPIs including latency, jitter and bandwidth, and tag a plurality of interfaces. At step 204 the orchestration server 120 selects a given service node of the one or more service nodes In view of the QoS measurement.

Figure 3:
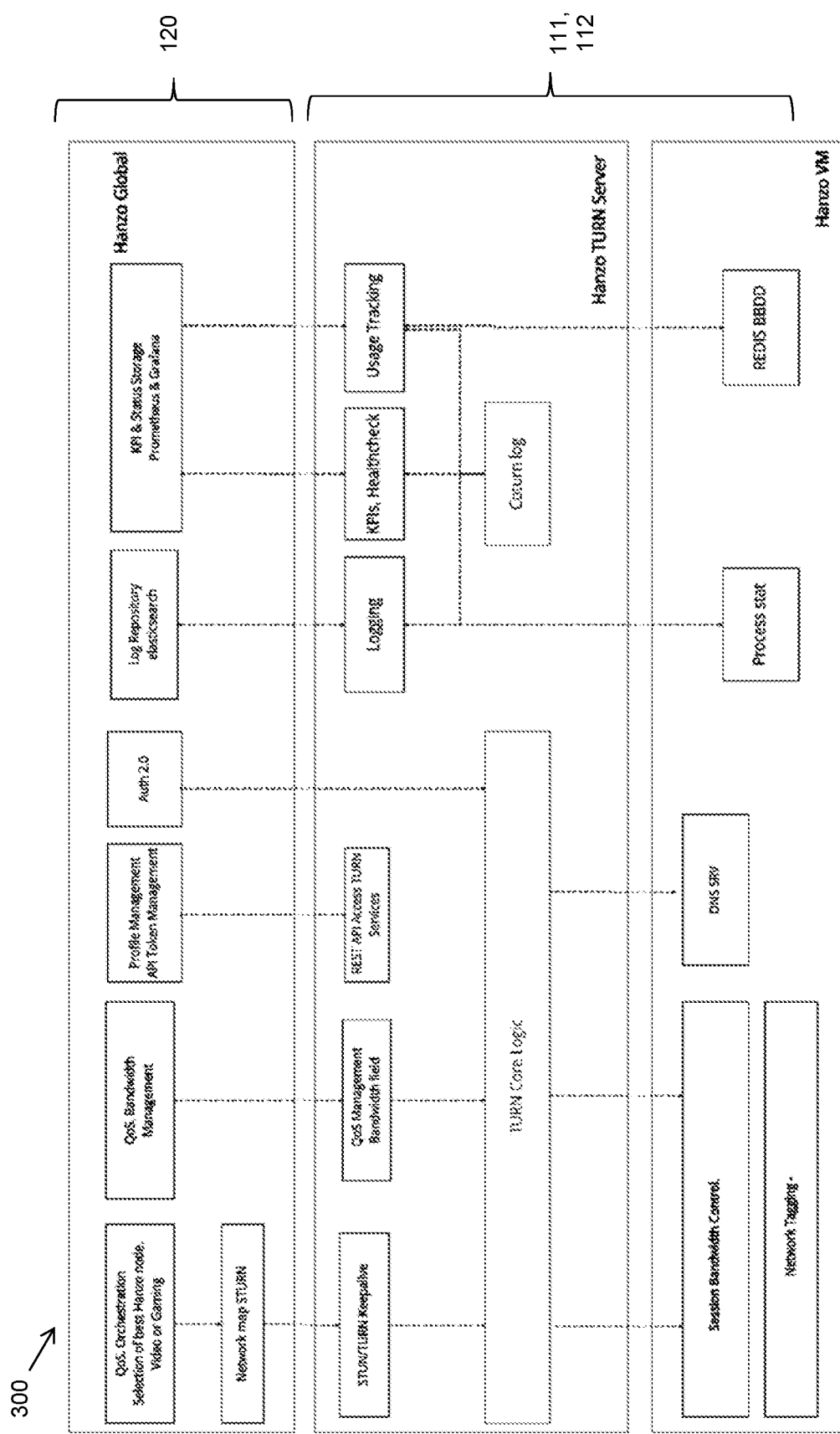
FIG. 3 schematically illustrates the design of a Hanzo Service Node or Hanzo Turn Server, according to an embodiment of the present invention.

FIG. 3 illustrates the design of the Hanzo Service Node or Hanzo Turn Server 300, according to an embodiment, illustrating the different components/modules/units implemented on the orchestration server 120 and on the services nodes 111, 112. A virtual machine (or Hanzo VM), is deployed on each service node 111, 112 to provide full isolation between the whole process. At this level the virtual machine can use/perform the following:

Control bandwidth. Adjust bandwidth at virtual machine level using wondershaper and/or TC opensource software.

Network tagging between three interfaces, first one for management, second one for international traffic, and the last one for service purposes.

DNS SRV. A bind server with the DNS SRV entries.

Process stat. For monitoring purposes it collects information from standard proc pseudo-filesystem of Linux operating system which provides an interface to kernel data structures.

Redis Database. As required for Hanzo Service Node or Hanzo Turn Server 300 Redis Database will store detailed information about the use of Hanzo Service Node or Hanzo Turn Server 300.

In addition, a software module (or Hanzo Coturn server) is implemented on each virtual machine, particularly based on Coturn opensource software instance to control which services nodes 111, 112 are in running state in order to route traffic or not. Other tasks/features/components of the software module can be:

QoS Management control to control QoS, in terms of latency, jitter and bandwidth. The algorithms and intelligence determine which interface and route must be used to achieve the service level agreement.

Rest API TURN Services. Module that will respond to a request to access to the service following the standard defined in http://tools.ietf.org/html/draft-uberti-behave-turn-rest-00.

Usage tracking & logging module to keep tracking of user consumption and logging, for billing or auditing purposes.

KPIs & Health checks metrics to monitor health status of the service nodes 111, 112 process and connections. KPIS can be:

QoS KPIs:
Bandwidth, jitter, latency.
IP metrics:
Total packets received, invalid head, forwarded, with unknown protocol, incoming packets discarded, incoming packets delivered, requests sent out, outgoing packets dropped, dropped because of missing route, reassembly required, and packets reassembled ok.
UDP metrics:
Packets received, packets to unknown port received, packet receive errors, packets sent, receive buffer errors and send buffer errors.
TCP metrics:
Active connection openings, passive connection openings, failed connection attempts, connection resets received, connections established, segments received, segments sent out, segments retransmitted, bad segments received and resets sent.
ICMP metrics:
Destination unreachable, echo requests, echo replies.

The orchestration server 120 is responsible for starting and maintaining the service nodes 111, 112 according to the needs of each tenant. This is performed based on the consumption of CPU, memory and mainly network resources, such as IP resources, among others, assigned to that tenant. This module 120 has the knowledge of the complete connectivity of the network and is the responsible of selecting the best service node 111, 112 for each connection based on location information, latency, jitter and bandwidth.

The orchestration server 120 can comprise a QoS bandwidth management unit/element (i.e. a software responsible of adapt the bandwidth to the connection), and a profile management software to keep control of users, groups of users, and tags related to users or groups, for each tenant. The orchestration server 120 can use Auth 2.0 to maintain compatibility with an industry-standard protocol for authorization. OAuth authorization framework is a protocol that allows a user to grant a third-party web site or application access to the user's protected resources, without necessarily revealing their long-term credentials or even their Identity. The orchestration server 120 can also have a Log Repository to ensure that the information of each of the connections, to which user they belong, the duration and quality is stored. In addition, the orchestration server 120 can have a KPI's Status module that ensures service KPIs SLA's compliance and previous technical KPIs.

Particularly, the invention takes into account the following:

Ready service node. The node is up and running to receive traffic.
Enabled service node. The node is processing network traffic and has the capacity to receive more connections.
Saturated service node. The node is processing network traffic but has reached 90% of the capacity of the node.
Disabled service node. The node is disabled due to any network or platform issue.

In some embodiments, the algorithm implemented by the orchestration server 120 can consider one or more of the following metrics:

Users geolocation: each user or request will be mapped to a pre-established physical point in the underlay network. It should be noted that the total number of possible physical points is limited and reflects the complexity of the network. The orchestration server 120 contains network metrics between any pair of a Hanzo Turn Server 300 and a physical point.
LHN(h, p): Latency between service node h and physical point p. For each service node alive table of latencies between the service node and any physical network point is maintained and stored.
JHN(h, p): Jitter between service node h and physical point p. For each service node a live table of Jitter between the service node and any physical network point is maintained and stored.
Each user has a weight (W) associated that indicates its importance in a multi-user application session. For instance, video traffic of the teacher should be more important than video traffic related with students in education application.
ACMG or Available Capacity Metric Gbps: based on the network infrastructure capacity in each location and consumption of bandwidth an available capacity metric measured in Gbps is determined.
HHNI Hanzo Health Node Indicator (0-1): Based on IP, TCP and UDP metrics a health node Indicator is measured in a percentage. These metrics determine how fast the service node is processing the traffic.

According to an embodiment, the selection rules for the best suitable service node 111, 112 is made by firstly selecting the Hanzo Service Node or Hanzo Turn servers according to their status. Only those nodes in Ready Status should be used as candidate nodes. Secondly, from these candidate nodes, all those nodes with ACMG less than a threshold will be discarded, and then, from previous candidate, all those nodes with HHNI less than a threshold will be discarded. At that point, for each node i in de candidate list, $V_i$ is computed according following function:

$$V_i = \sum_{j=1}^{N}(LHN(i,j) \times \alpha + JHN(i,j) \times (1-\alpha)) \times W_j,$$

where $\alpha \in [0,1]$ indicates the relative importance of Latency and Jitter in a given service, whereas $W_j$ is the user weight of the user j in the application session. These two parameters can change according the application requirements. Finally, the service node 111, 112 that minimizes the value of $V_i$ is selected.

Figure 4:
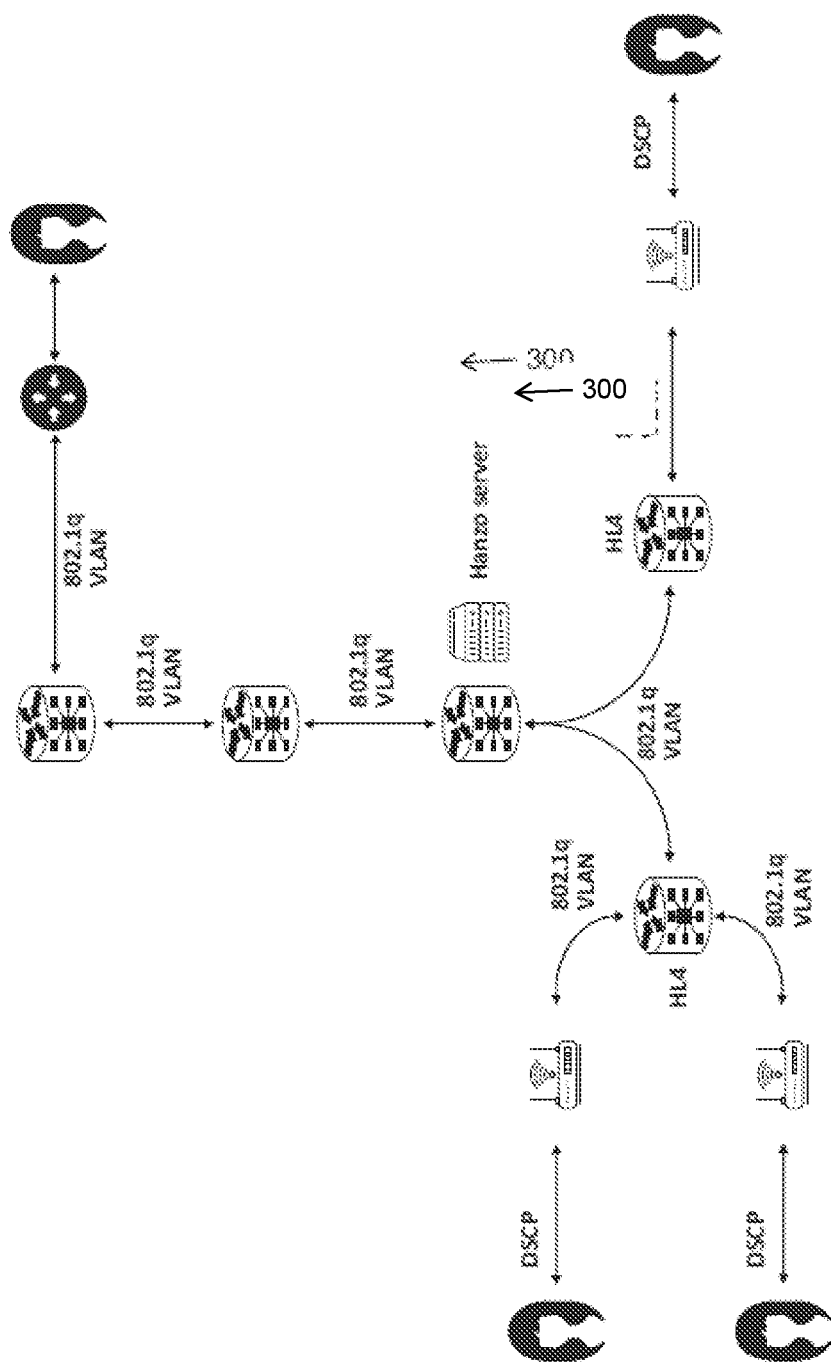
FIG. 4 illustrates the network QoS configuration scheme, according to an embodiment of the present invention.

With reference to FIG. 4 therein an example of the network QoS configuration scheme is illustrated. The network QoS is based on several technologies including:

DSCP for WiFi access between devices and home router. It's based on the IEEE 802.11e wireless QoS standard, and works with 802.11a, b, g, and n physical layer standards. At WiFi level user will interact with an APP to select and give priority to the selected service. DSCP is a process to classify and mark network packets that belong to a specific class. A limited number of classes are defined in Diffserv.

802.1p. Using the QoS and VLAN priorities technology the service nodes 111, 112 assign a priority to the outputted packets. Packets containing the specified VID are marked with the priority level configured in a packet classifier into internal network. This 802.1 priority determines the outbound port queue to which the packet is sent.

For Mobile networks QCI (QoS Class Identifier) will be used to ensure that traffic is routed in their appropriate traffic type.

Quality will be selected between RT traffic and no RT traffic. Both quality selections will be done using configurations of packets processing queues in each location where a service node 111, 112 will be running. Service nodes 111, 112 will be connected to two different network interfaces one for RT and other for no RT, selection of the Interface will be determined by SLA agreement.

For the traffic flow, in the service provider router access a configuration for Ingress and egress is done in each router and applied in each interface for the different QoS. A VLAN is associated to each one interface type in the configuration of the router. Each marked packet will be treated and respected throughout the service provider network. Outside the service provider, this prioritization will have no effect.

Various aspects of the proposed method, as described herein, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

Those skilled in the art will recognize that the present teachings are amenable to a variety of modifications and/or enhancements. For example, although the implementation of various components described herein may be embodied in a hardware device, it may also be implemented as a software only solution—e.g., an installation on an existing server. In addition, image processing as disclosed herein may be implemented as a firmware, firmware/software combination, firmware/hardware combination, or a hardware/firmware/software combination.

The present disclosure and/or some other examples have been described in the above. According to descriptions above, various alterations may be achieved. The topic of the present disclosure may be achieved in various forms and embodiments, and the present disclosure may be further used in a variety of application programs. All applications, modifications and alterations required to be protected in the claims may be within the protection scope of the present disclosure.

The scope of the present invention is defined in the following set of claims.

The invention claimed is:

1. A method for packet data network service slicing over a network infrastructure for real-time IP services, said network infrastructure comprising a plurality of regions linked via a transportation network, each region of the plurality of regions having a plurality of service nodes, the method comprising:
    providing an orchestration server at a given location where a service provider is located, the orchestration server having knowledge of a whole connectivity status of the network infrastructure, and being configured to manage the plurality of service nodes;
    receiving, by the orchestration server, a session request for a real-time Internet Protocol (IP) service from a user equipment (UE) device located in a given region of said plurality of regions;
    upon reception of said session request, requesting, by the orchestration server, one or more service nodes of the plurality of service nodes of said given region whether the one or more service nodes have network resources;
    discard, by the orchestration server, the service nodes of the one or more service nodes with a Health Node Indicator (HHNI) less than a threshold, the HHNI being based on IP metrics, User Datagram Protocol (UDP) metrics, Transmission Control Protocol (TCP) metrics and/or Internet Control Message Protocol (ICMP) metrics; and
    subsequent to the discarding, selecting, by the orchestration server, a given service node of the one or more service nodes in view of a Quality of Service (QoS) measurement for respective service nodes of the one or more service nodes,
        wherein the QoS measurement is based on Key Performance Indicators (KPI), the KPI comprising latency, jitter and bandwidth,
        wherein the latency is a latency between a respective service node and a physical point in the network infrastructure to which the UE is mapped,
        wherein the jitter is a jitter between the respective service node and the physical point in the network infrastructure to which the UE is mapped, and
        wherein the QoS measurement is computed by a software module that is implemented on a virtual machine deployed on a respective service node.

2. The method of claim 1, wherein the method further comprising the respective service nodes tagging a plurality of interfaces, the tagging being performed by a respective virtual machine, the plurality of interfaces comprising three interfaces, a first one for IP management, a second one for international IP traffic and a third one for IP services.

3. The method of claim 2, wherein the software module further computes which route through the IP services interface has to be used for the session request.

4. The method of claim 1, wherein the one or more service nodes further computes a set of metrics including the IP metrics, the UDP metrics, the TCP metrics and/or the ICMP metrics.

5. The method of claim 3, wherein prior to the selecting, the method further comprises discarding the service nodes of said one or more service nodes with an available capacity metric (ACMG) less than a threshold.

6. The method of claim 1, wherein the real-time IP service comprises at least one of video conference, gaming, remote video production, remote health.

7. An orchestration server for packet data network service slicing over a network infrastructure for real-time IP services, said network infrastructure comprising a plurality of regions linked via a transportation network, each region of the plurality of regions having a plurality of service nodes, wherein the orchestration server is located at a given location where a service node is located, has knowledge of a whole connectivity status of the network infrastructure, and is configured to:

receive a session request for a real-time Internet Protocol, IP, service from a user equipment, UE, device located in a given region of said plurality of regions;

request to one or more service nodes of the plurality of service nodes of said given region whether it has/they have network resources;

discard the service nodes of the one or more service nodes with a Health Node Indicator (HHNI) less than a threshold, the HHNI being based on a set of metrics computed by the one or more service nodes and including IP metrics, User Datagram Protocol (UDP) metrics, Transmission Control Protocol (TCP) metrics and/or Internet Control Message Protocol (ICMP) metrics; and subsequent to discarding, select a given service node of the one or more service nodes in view of a Quality of Service (QoS) measure for respective nodes of the one or more service nodes, wherein the QoS measure is based on Key Performance Indicators (KPI), the KPI comprising latency, jitter and bandwidth, wherein the latency is a latency between a respective service node and a physical point in the network infrastructure to which the UE is mapped, wherein the jitter is a jitter between the respective service node and the physical point in the network infrastructure to which the UE is mapped, and wherein the QoS measure is computed by a software module implemented on a virtual machine deployed on a respective service node.

8. The orchestration server of claim 7, wherein, prior to the selecting, the orchestration server is further configured to discard the service nodes of said one or more service nodes with an available capacity metric (ACMG) less than a threshold.

9. The orchestration server of claim 7, wherein the real-time IP service comprises at least one of video conference, gaming, remote video production, remote health.

* * * * *